UNITED STATES PATENT OFFICE.

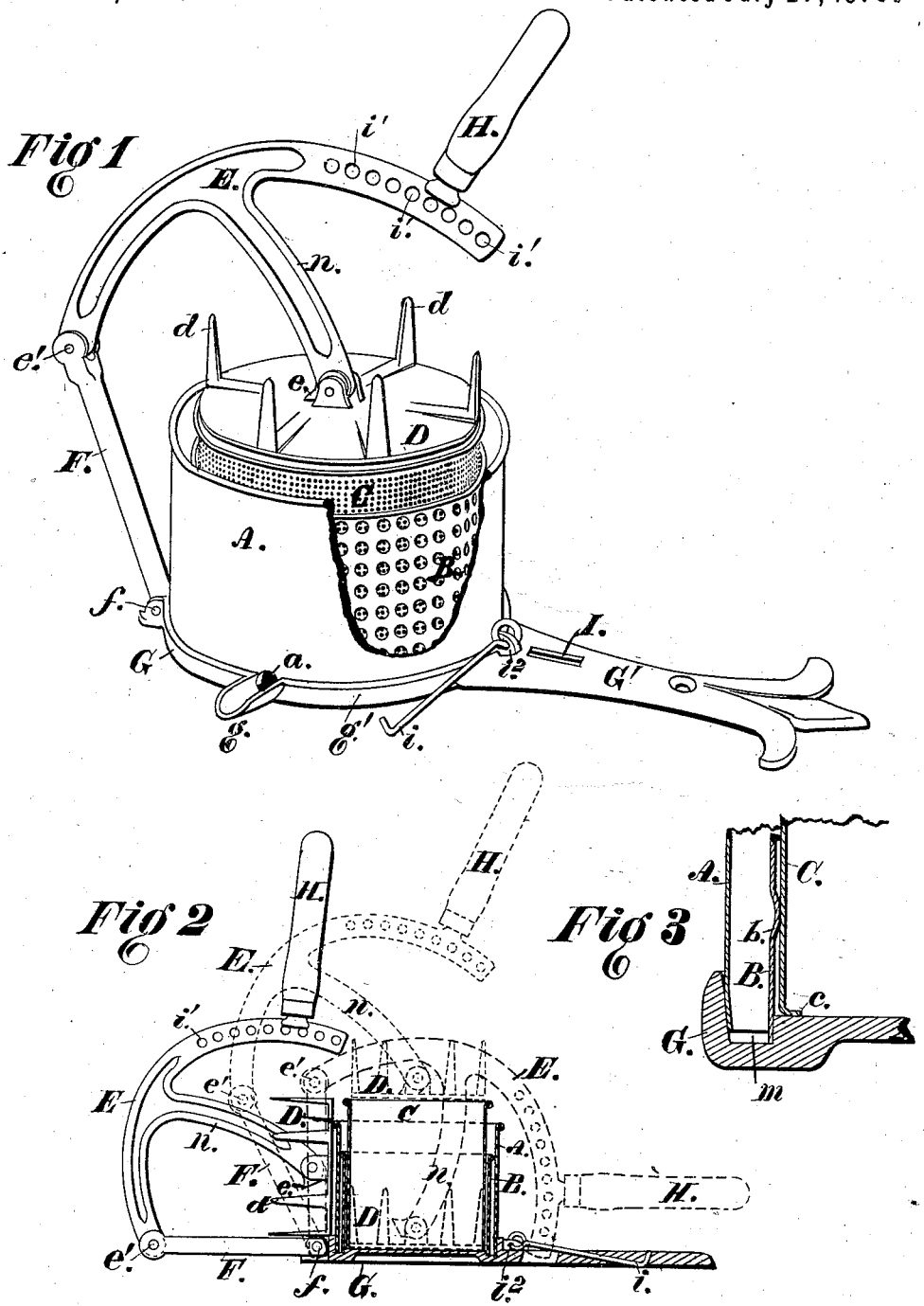

ISAAC W. HEYSINGER, OF PHILADELPHIA, PENNSYLVANIA, ASSIGNOR OF ONE-HALF HIS RIGHT TO STEWART & MATTSON, OF SAME PLACE.

IMPROVEMENT IN FRUIT-PRESSES.

Specification forming part of Letters Patent No. 166,103, dated July 27, 1875; application filed June 29, 1875.

*To all whom it may concern:*

Be it known that I, ISAAC W. HEYSINGER, of Philadelphia, county of Philadelphia and State of Pennsylvania, have invented a certain Fruit-Press, of which the following is a specification:

My invention relates to the construction and the combination of the parts composing a press for forcing out the juice and pulp of the smaller fruits and berries, such as grapes and currants, and leaving the skins and seeds where they can be conveniently removed.

The principal parts are, first, a base-plate, upon which the lever bearing a plunger is pivoted, and which is so constructed as to be fastened by screws to a table for use, and which is provided with a circular rim, the inner surface of which inclines outwardly, so that an outer hollow cylinder may be inserted within it, and be fastened therein upon the wedge principle. This outer cylinder serves to prevent the escape of the juices when the press is operated; and just within this hollow cylinder is fixed another, thoroughly perforated. The space between these cylinders, bounded by the base-plate, constitutes a way or trough to lead the juices to a spout extending from the base-plate. Secondly, a third hollow cylinder, thoroughly perforated with small holes and bent inwardly at the bottom, so as to form a ledge, and within this is placed the fruit or berries to be operated upon. It fits closely within the middle cylinder, and is as tall as, and taller than, the outer cylinder, and its small perforations permit the juices to escape through them, while the ledge extending inwardly from the bottom enables it, when being removed, to take with it the pomaceous remains of the fruits after the expression of their juices. Thirdly, a lever curved into a parabolic form, and having its outer end connected with the base-plate by a straight link, while its opposite end is perforated with a series of holes, and a suitable handle to operate the same, while its central portion is provided with a rigid arm extending downward, to the lower end of which is pivoted a plunger, which is provided with a series of fingers extending directly upward from its periphery, and these fingers serve to secure true action of the plunger as it passes up and down within the inner perforated cylinder. The plunger is made heavier on its side next the operator than on the opposite side, which construction will cause it to assume a horizontal position before it enters the cylinder. The stop at $e$ on the lower end of the rigid arm $n$ will prevent its back edge from tilting too high. Fourthly, a link attached by means of a hook and eye to the base-plate at one end, and a hook at the other end, to be inserted in any of the holes before mentioned in such end of the curved lever, the object of which is to enable the operator, after exerting pressure upon the fruit within the inner perforated cylinder, to fasten the lever, so that pressure may continue as long as may be desired, and afford time for the juices to find their way out.

In the accompanying drawings, Figure 1 represents a perspective view of the whole machine; Fig. 2, a vertical and nearly central section of the same, showing the positions of the handle, lever, and plunger, when the machine is not in use, by solid lines, and their positions when the plunger is in the act of entering the inner cylinder, and when it has reached the bottom thereof in broken lines; and Fig. 3, a vertical section of a portion of the base-plate and the three cylinders, showing the ledge upon the inner cylinder, the manner in which the outer cylinder is wedged into the rim of the base-plate, and how the leading trough for the juices is formed.

H is the handle; E, the curved lever; $i^1 i^1 i^1$, its perforations; $n$, its rigid arm; $e$, its joint, with the plunger D; $d\ d\ d$, the vertical fingers upon the plunger; $e^1$, the pin by which the outer end of the lever and the upper end of the link F are connected; $f$, the pin forming the connection between the base-plate and the lower end of the link F; G, the base-plate; A, the outer cylinder; B, the middle cylinder, which is rigidly attached to the base-plate; C, the inner cylinder; $g$, the spout in the base-plate; $a$, the opening in the bottom edge of the outer cylinder, through which the juices escape into the spout; $m$, the leading trough; $i$, the link, hooked into an eye, $e^2$, in the base-plate to hold the lever E down by means of its hook and the holes $i^1 i^1 i^1$. It will be observed that the lever E, having the peculiar shape shown, and the rigid arm n, and connected to the base-plate by the link F, will exert force upon the plunger D, after the manner of the toggle-joint, and that the short arm of the lever will become in effect shorter and shorter, and its power will be increased from the time the plunger enters the top of the inner cylinder until it reaches the lower end of it, where the pressure exerted by the lever will have been multiplied several fold without an increase of force upon the handle. The middle cylinder is a stay and support for the inner cylinder C; and it may be used without the cylinder C for the large fruits and berries, and also lard and cheese, which might require its larger perforations for the escape of their thicker pulp.

What I claim as my invention, and desire to secure by Letters Patent, is—

1. The combination of the bed-plate G, having the vertical rim $g'$ flared out gradually from its bottom to its top on its inner side, and the removable cylinder A, so that cylinder A, when forced within it, will be held there without other fastening, substantially as and for the purpose described.

2. The curved lever E, having the rigid arm n, and connected at its outer end with the base-plate G by means of the link F, and having the traveling or shifting joint with lever F at $e^1$, substantially as and for the purpose described.

3. The plunger D, having the vertical fingers d, and jointed to the arm n at e, and adapted to perpendicular action, with a perforated pulp-cylinder in combination therewith, substantially as and for the purpose set forth.

4. The combination of the removable cylinder C, having the inner ledge c, the fixed cylinder B, cylinder A, and bed-plate G, substantially as and for the purpose described.

5. The combination of the link i, attached by a hook and eye at $i^2$ to the base-plate G with the rear and perforated end of lever F, substantially as and for the purpose described.

I. W. HEYSINGER.

Witnesses:
P. O. DONNELL,
F. L. ROEPKE.